United States Patent
Hills et al.

(10) Patent No.: US 10,094,950 B2
(45) Date of Patent: Oct. 9, 2018

(54) SYSTEM AND METHOD FOR DETECTING AND RECONSTRUCTING OBJECTS IN A NON-CONTINUOUS STREAM OF ITEMS IN AN IMAGING SYSTEM

(71) Applicant: Morpho Detection, LLC, Newark, CA (US)

(72) Inventors: Steven Leslie Hills, Union City, CA (US); Samit Kumar Basu, Fremont, CA (US)

(73) Assignee: MORPHO DETECTION, LLC, Newark, CA (US)

( * ) Notice: Subject to any disclaimer, the term of this patent is extended or adjusted under 35 U.S.C. 154(b) by 291 days.

(21) Appl. No.: 15/206,804

(22) Filed: Jul. 11, 2016

(65) Prior Publication Data

US 2018/0011214 A1    Jan. 11, 2018

(51) Int. Cl.
*G01V 5/00* (2006.01)

(52) U.S. Cl.
CPC ............ *G01V 5/005* (2013.01); *G01V 5/0008* (2013.01)

(58) Field of Classification Search
CPC .............................. G01V 5/0008; G01V 5/005
See application file for complete search history.

(56) References Cited

U.S. PATENT DOCUMENTS

| | | | |
|---|---|---|---|
| 6,317,509 B1 * | 11/2001 | Simanovsky | G01V 5/005 250/363.04 |
| 2005/0276468 A1 * | 12/2005 | Ying | G01T 1/2985 382/154 |
| 2007/0230657 A1 * | 10/2007 | Garms | G01N 23/046 378/57 |
| 2008/0043917 A1 * | 2/2008 | Oreper | G01V 5/0025 378/116 |
| 2009/0003515 A1 | 1/2009 | Naidu et al. | |
| 2009/0067575 A1 | 3/2009 | Seppi et al. | |
| 2014/0376692 A1 * | 12/2014 | Schafer | G01V 5/0016 378/57 |

FOREIGN PATENT DOCUMENTS

WO    2006082521 A2    8/2006

OTHER PUBLICATIONS

Extended European Search Report, Application No. 17001181.1-1559, dated Nov. 6, 2017, 9 pps.

* cited by examiner

*Primary Examiner* — Dani Fox
(74) *Attorney, Agent, or Firm* — Armstrong Teasdale LLP (57) ABSTRACT

A controller for detecting objects moving in a first direction in a computed tomography (CT) imaging system is provided. The controller is configured to detect objects by assembling a plurality of segments based on a plurality of CT imaging slices. In response to receiving a stop request, the controller is configured to detect objects by causing the CT imaging system to cease a flow of objects, discarding the one or more of the plurality of CT imaging slices associated with a first segment and a second segment of the plurality of segments, causing the CT imaging system to move the objects in a second direction for an interruption distance in which the second direction is opposite the first direction, causing the CT imaging system to move the objects in the first direction, and reassembling the first segment and the second segment.

20 Claims, 5 Drawing Sheets

SYSTEM AND METHOD FOR DETECTING AND RECONSTRUCTING OBJECTS IN A NON-CONTINUOUS STREAM OF ITEMS IN AN IMAGING SYSTEM

BACKGROUND

The embodiments described herein relate generally to image processing, and more particularly, to detecting objects in a continuous stream of items from imaging data generated by a computed tomography (CT) imaging system.

Known checkpoint scanning systems, such as Advanced Technology X-ray (AT) systems or Threat Image Projection Ready X-ray (TRX) systems, are designed to scan a continuous stream of luggage and other objects to provide adequate throughput for travelers at an airport checkpoint, for example. However, it is common for an operator of a checkpoint scanning system to start and stop the flow of items for a number of reasons, such as to further inspect a suspicious piece of luggage or a passenger holds up a security line, for example. This is not an issue for AT and TRX systems because of the nature of the technology used to acquire image data. In contrast, for CT scanning systems this starting and stopping during image data acquisition is an issue. It causes the reconstruction process to become much more computationally intensive relative to the reconstruction process associated with image data being acquired at a constant velocity and pitch.

Thus, reconstructing images from data acquired during periods of acceleration and deceleration where the pitch is continually changing remains daunting. To attempt to cope with reconstruction processing during the starting and the stopping using conventional techniques a relatively powerful computer would be required to handle the computational complexity of a variable pitch in a reasonable amount of time. However, these more powerful computers remain prohibitively expensive for a security checkpoint application. When a traditional computer is utilized to process the complex computations of a variable pitch that occur during the starting and stopping of the continuous stream of items, the excessive amount of time required to reconstruct CT images remains impractical for the high passenger throughput needed at a checkpoint, for example.

BRIEF SUMMARY

In one aspect, an object detection controller for detecting objects moving in a first direction in a computed tomography (CT) imaging system is provided. The object detection controller includes a processor coupled to a memory device and to the CT imaging system. The object detection controller is configured to detect objects by receiving CT imaging data generated by the CT imaging system, generating a plurality of CT imaging slices from the CT imaging data, and assembling a plurality of segments based on the generated plurality of CT imaging slices. Furthermore, two neighboring segments of the plurality of segments include at least one substantially equivalent CT imaging slice. In response to receiving a stop request, the object detection controller is configured to cause the CT imaging system to cease the flow of objects and discard one or more of the plurality of CT imaging slices associated with a first segment and a second segment of the plurality of segments, in which the first segment and the second segment are being assembled at the time the stop request is received. Also in response to receiving the stop request, the object detection controller is configured to cause the CT imaging system to move the objects in a second direction for an interruption distance in which the second direction is opposite the first direction. In further response to receiving the stop request, the object detection controller is configured to cause the CT imaging system to move the objects in the first direction and reassembling the first segment and the second segment based on newly received CT imaging slices.

In another aspect, a computer-implemented method for detecting objects moving in a first direction in a computed tomography (CT) imaging system is provided. The method is implemented using an object detection device including a processor coupled to a memory device and to the CT imaging system. The method includes receiving CT imaging data generated by the CT imaging system, generating a plurality of CT imaging slices from the CT imaging data, and assembling a plurality of segments based on the generated plurality of CT imaging slices. Furthermore, two neighboring segments of the plurality of segments include at least one substantially equivalent CT imaging slice. In response to receiving a stop request, the method also includes causing the CT imaging system to cease a flow of objects and discarding one or more of the plurality of CT imaging slices associated with a first segment and a second segment of the plurality of segments, in which the first segment and the second segment are being assembled at the time the stop request is received. Also in response to receiving the stop request, the method includes causing the CT imaging system to move the objects in a second direction for an interruption distance in which the second direction is opposite the first direction. In further response to receiving the stop request, the method includes causing the CT imaging system to move the objects in the first direction and reassembling the first segment and the second segment based on newly received CT imaging slices.

In yet another aspect, at least one non-transitory computer-readable storage media having computer-executable instructions embodied thereon for detecting objects moving in a first direction in a computed tomography (CT) imaging system is provided. When executed by at least one processor, the computer-executable instructions cause the processor to receive CT imaging data generated by the CT imaging system, generate a plurality of CT imaging slices from the CT imaging data, and assemble a plurality of segments based on the generated plurality of CT imaging slices. Furthermore, two neighboring segments of the plurality of segments include at least one substantially equivalent CT imaging slice. In response to receiving a stop request, the computer-executable instructions cause the CT imaging system to cease a flow of objects and discard one or more of the plurality of CT imaging slices associated with a first segment and a second segment of the plurality of segments, in which the first segment and the second segment are being assembled at the time the stop request is received. Also in response to receiving the stop request, the computer-executable instructions cause the CT imaging system to move the objects in a second direction for an interruption distance, in which the second direction is opposite the first direction. In further response to receiving the stop request, the computer-executable instructions cause the CT imaging system to move the objects in the first direction and reassemble the first segment and the second segment based on newly received CT imaging slices.

BRIEF DESCRIPTION OF THE DRAWINGS

FIGS. 1-5 show exemplary embodiments of the systems and methods described herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations are combined and interchanged, such ranges are identified and include all the sub-ranges contained therein unless context or language indicates otherwise.

As used herein, the terms "processor" and "computer," and related terms, e.g., "processing device," "computing device," and "controller" are not limited to just those integrated circuits referred to in the art as a computer, but broadly refers to a microcontroller, a microcomputer, a programmable logic controller (PLC), and application specific integrated circuit, and other programmable circuits, and these terms are used interchangeably herein. In the embodiments described herein, memory may include, but it not limited to, a computer-readable medium, such as a random access memory (RAM), a computer-readable non-volatile medium, such as a flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable, and include any computer program storage in memory for execution by personal computers, workstations, clients, and servers.

As used herein, "instantaneous" or "real-time" refers to outcomes occurring at a substantially short time period after an input. The time period is a result of the capability of object detection device implementing processing of image data to generate CT imaging slices and segments or process control functions in relation to controlling aspects of a CT scanning system. Events occurring instantaneously or in real-time occur without substantial intentional delay or latency. In the embodiments described herein, these activities and events occur substantially instantaneously.

As used herein, the term "non-transitory computer-readable media" is intended to be representative of any tangible computer-based device implemented in any method of technology for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including without limitation, volatile and non-volatile media, and removable and non-removable media such as firmware, physical and virtual storage, CD-ROMS, DVDs, and any other digital source such as a network or the Internet, as well as yet to be developed digital means, with the sole exception being transitory, propagating signal.

The systems and methods described herein facilitate starting and stopping a CT scanning scanner that scans a continuous stream of objects based on imaging data generated by a computed tomography (CT) imaging system that includes at least an object detection controller.

The subject matter described herein includes an object detector that addresses the challenges described above, in part, by performing a reconstruction process that allows an operational CT scanning system to be stopped and restarted with minimal downtime and minimal computational effort. When an inspector is using a CT scanning system to monitor a continuous stream of objects (for example and without limitation, pieces of luggage, bags, shoes, coats, and any other item) at an airport security checkpoint, for example, there are various reasons to stop the flow of objects or items passing through a CT scanner. However, stopping the flow of objects creates a period of deceleration and conversely, acceleration when the flow of objects or items starts again. The resulting variable pitch during these periods of non-constant velocity adds computational complexity to the reconstruction process. Accordingly, the techniques described herein advantageously allow for the operational CT scanning system to be stopped, the flow of objects automatically reversed a predetermined distance, and restarted with minimal downtime and minimal computational effort.

More specifically, an object detection controller for detecting objects in a computed tomography imaging system is provided. The object detection device includes a processor coupled to a memory device and to the CT imaging system. The object detection controller receives CT imaging data from the CT imaging system. Additionally, the object detection controller generates a plurality of CT imaging slices from the CT imaging data. The object detection controller assembles overlapping segments based on the generated plurality of CT imaging slices. For example, two neighboring segments include one or more of the same CT imaging slices such that each CT imaging slice is associated with least two different segments and stored in two different locations in memory or storage. In turn, when an inspector initiates a stop request (or any other impetus that requests for the CT scanner to come to a halt), the object detection controller receives this stop request and causes the CT imaging system to cease a flow of items. The object detection controller discards the one or more CT imaging slices associated with a first segment and a second segment of the plurality of segments that are both being assembled at the time the stop request is requested. The object detector controller causes the CT imaging system to move the objects in a direction reverse the flow of objects by an interruption distance. This interruption distance equals at least the summation of a deceleration distance and an acceleration distance. The object detector controller causes the CT imaging system to move the objects in the direction of the flow of items and reassembles the first segment and the second segment based on newly received CT imaging slices.

In some embodiments, the object detection device stores the plurality of CT imaging slices associated with one or more segments as a three dimensional representation of objects. The object detection device, in some implementations, is housed within (e.g., incorporated within) the CT imaging system.

Figure 1:
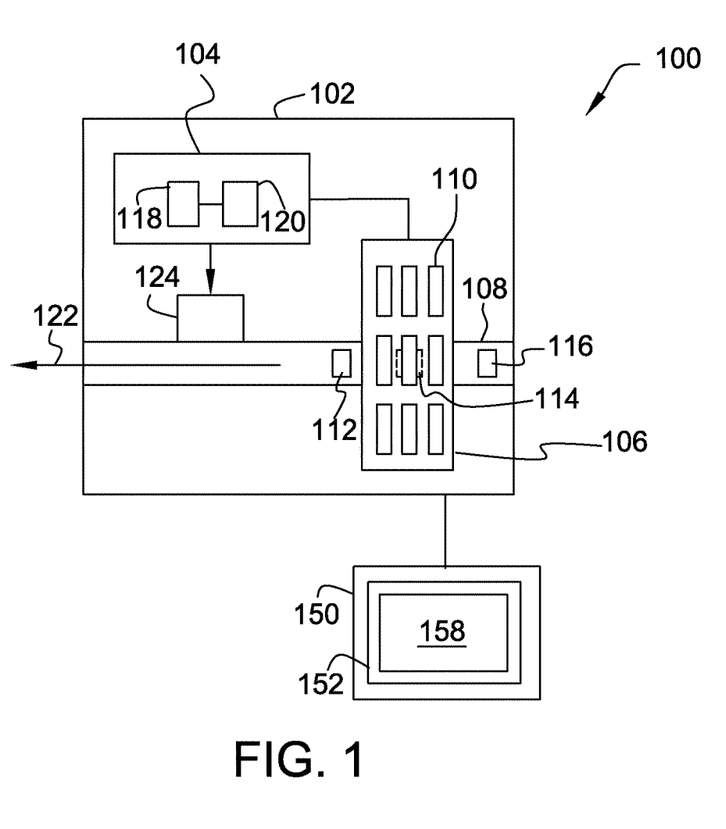
FIG. 1 is a schematic diagram of an exemplary system for detecting objects from imaging data generated by a computed tomography (CT) imaging system, which includes an object detection controller.

FIG. 1 is a schematic diagram of an exemplary object detection system 100 for detecting objects in a continuous stream of items from a CT imaging system 102, which includes a conveyor belt 108 and a CT imaging scanner 106 that is communicatively coupled to an object detection controller 104. CT imaging system 102 is described herein with respect to the particular example of a checkpoint scanner (e.g., as part of a security process in an airport, train station, courthouse, or any other type of security checkpoint). It should be understood that CT imaging system 102 may be utilized in other applications as well. Furthermore, CT imaging system 102 includes a processor (not shown), a memory (not shown), and a rotating gantry (not shown) that includes a plurality of imaging devices 110. A motor 124 is configured to operate conveyor belt 108 in a direction of a flow of objects 122 or in the reverse of the direction of the flow of objects. Conveyor belt 108 is configured to transport items 112, 114, 116 (for example and without limitation, luggage, bags, coats, shoes, plastic bins of loose objects, or briefcases) to be imaged axially through the rotating gantry. Each imaging device of plurality of imaging devices 110 is configured to capture image data of items 112, 114, 116 channeled therethrough. Each imaging device of plurality of imaging devices 110 may include a camera, a scanner, a laser, a detector, and/or any other suitable imaging device or combination thereof. Imaging devices 110 may be coupled to and/or integral with rotating gantry. For example and without limitation, imaging devices 110 include a plurality of X-ray detectors arranged in a two-dimensional (2D) array or any other suitable arrangement. This image data is transmitted to an object detection controller 104 by an imaging signal.

Object detection controller 104 includes a memory 118 communicatively coupled with a processor 120. Processor 120 is configured to execute instructions stored in memory that implements a detection and/or process control method or algorithm as described herein. In the example embodiment, implementation of the detection method includes multiple computational and process control steps. Advantageously, while continuous stream of objects 404 moves in the direction of flow as a continuous display to the inspector, object detection controller 104 allows an inspector to select a particular segment to more closely analyze the object or contents represented within a segment. Moreover, object detection controller 104 allows for the operational CT scanning system to be stopped, the flow of items automatically reversed a predetermined distance, and restarted with minimal downtime and minimal computational effort.

CT imaging system 102 (and object detection controller 104) is further in direct communication (e.g., wireless or in a wired connection) with one or more external computing devices 150. While only one external computing device 150 is shown in FIG. 1, any number of external computing devices 150 may be in communication with CT imaging system 102. Alternatively, one or more other computing devices (for example and without limitation, image processing computing devices, process control computing devices, external controllers, batch processing computing devices, or any other external computing device) may be communicatively coupled to one or both of CT imaging system 102 and/or external computing device 150. CT imaging system 102 transmits a 2D or three-dimensional (3D) representation across an image data signal to external computing device 150. Image data signal includes human-perceivable image data that generally represents the scanned object in a human-perceivable 2D or 3D representation and is generated by object detection controller 104 after the implementation of the object detection algorithm on image data, reconstruction transformed image data (based on the image data), or any other type of data. In one embodiment, external computing device 150 is configured to process human-perceivable image data before displaying the visual representation 158 of the received image data thereof on output device 152. In another embodiment, CT imaging system 102 (or object detection controller 104 therein) transmits human-perceivable image data substantially continuously and in substantially real-time. In some embodiments, CT imaging system 102 (or object detection controller 104 therein) transmits human-perceivable image data that may be configured to be interactive with a user in a three dimensional manner, such as allowing a user to spin, to pan, to rotate, or otherwise to manipulate with a 3D representation of a scanned object based on the segments.

Figure 2:
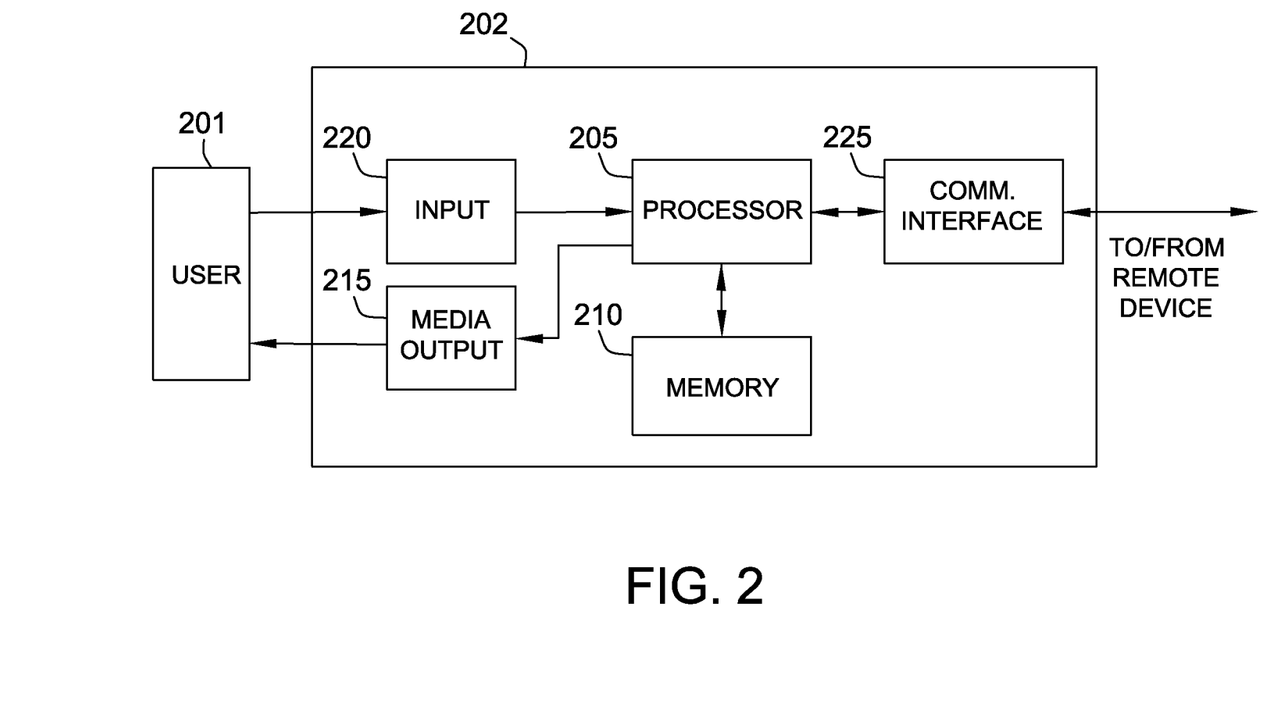
FIG. 2 is a schematic block diagram of an object detection device that may be used to implement the system shown in FIG. 1.

FIG. 2 is a schematic block diagram of a computing device 202 that may be used to implement system 100 (shown in FIG. 1). For example, object detection controller 104 and/or external computing device 150 may be implemented using computing device 202. Computing device 202 includes at least one memory device 210 and a processor 205 that is coupled to memory device 210 for executing instructions. In some implementations, executable instructions are stored in memory device 210. In the exemplary implementation, computing device 202 performs one or more operations described herein by programming processor 205. For example, processor 205 may be programmed by encoding an operation as one or more executable instructions and by providing the executable instructions in memory device 210.

Processor 205 may include one or more processing units (e.g., in a multi-core configuration). Further, processor 205 may be implemented using one or more heterogeneous processor systems in which a main processor is present with secondary processors on a single chip. In another illustrative example, processor 205 may be a symmetric multi-processor system containing multiple processors of the same type. Further, processor 205 may be implemented using any suitable programmable circuit including one or more systems and microcontrollers, microprocessors, reduced instruction set circuits (RISC), application specific integrated circuits (ASIC), programmable logic circuits, field programmable gate arrays (FPGA), and any other circuit capable of executing the functions described herein.

In the exemplary implementation, memory device 210 is one or more devices that enable information such as executable instructions and/or other data to be stored and retrieved. Memory device 210 may include one or more computer readable media, such as, without limitation, dynamic random access memory (DRAM), static random access memory (SRAM), a solid state disk, and/or a hard disk. Memory device 210 may be configured to store, without limitation, object detection algorithm instructions, image data, process control algorithm instructions, reconstruction transformation algorithms, and/or any other type of data.

In the exemplary implementation, computing device 202 includes a media output 215 that is coupled to processor 205. Media output 215 presents information to a user 201. For example, media output 215 may include a display adapter (not shown) that may be coupled to a display device, such as a cathode ray tube (CRT), a liquid crystal display (LCD), an organic LED (OLED) display, and/or an "electronic ink" display. In some implementations, media output 215 includes one or more display devices.

In the exemplary implementation, computing device 202 includes a user input interface 220. User input interface 220 is coupled to processor 205 and receives input from user 201. User input interface 220 may include, for example, a keyboard, a pointing device, a mouse, a stylus, a touch sensitive panel (e.g., a touch pad or a touch screen), a gyroscope, an accelerometer, a position detector, and/or an audio user input interface. A single component, such as a touch screen, may function as both a display device of media output 215 and user input interface 220.

Computing device 202, in the exemplary implementation, includes a communication interface 225 coupled to processor 205. Communication interface 225 communicates with one or more remote devices. To communicate with remote devices, communication interface 225 may include, for example, a wired network adapter, a wireless network adapter, and/or a mobile telecommunications adapter.

Figure 3:
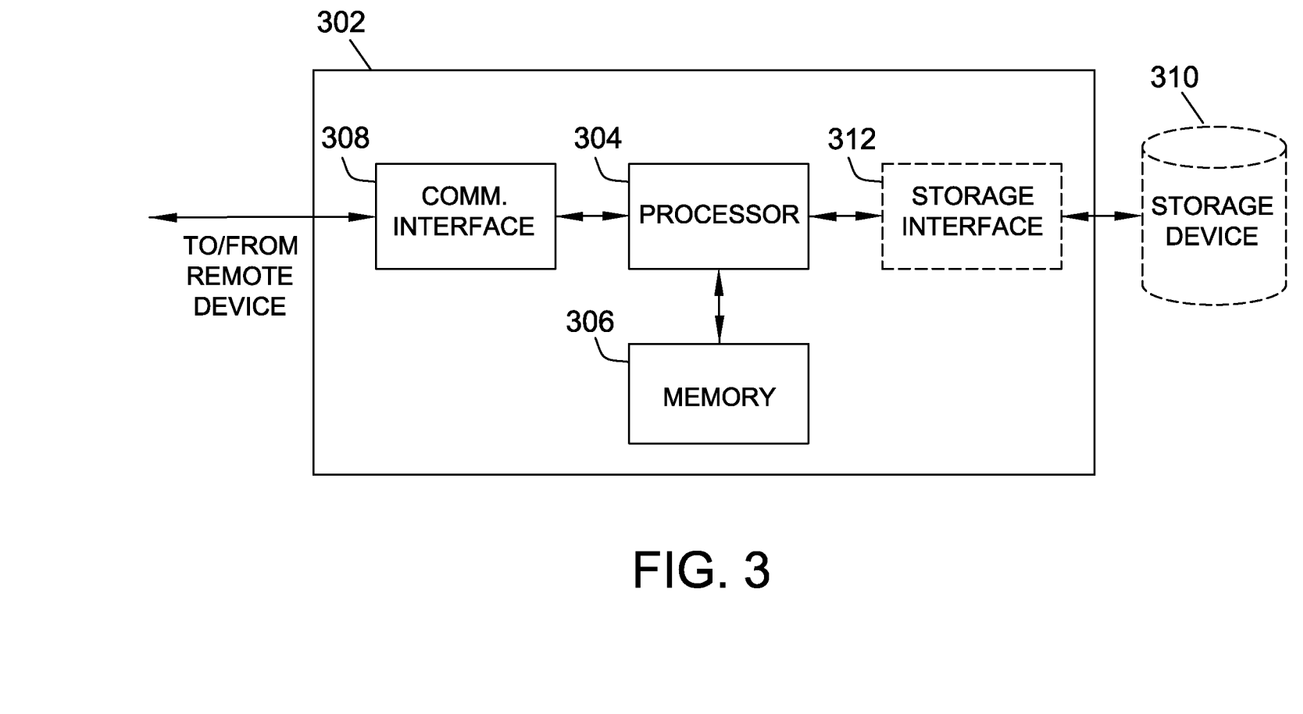
FIG. 3 is a schematic block diagram of a server computing device that may be used to implement the system shown in FIG. 1.

FIG. 3 is a schematic block diagram of a server computing device 302 that may be used to implement system 100 (shown in FIG. 1). For example, object detection controller 104, CT imaging system 102 may be implemented using server computing device 302. Server computing device 302 includes a processor 304 for executing instructions. Instructions may be stored in a memory area 306, for example. Processor 304 may include one or more processing units (e.g., in a multi-core configuration).

Processor 304 is operatively coupled to a communication interface 308 such that server computing device 302 is capable of communicating with a remote device, such as computing device 202 (shown in FIG. 2) or another server computing device 302. Processor 304 may also be operatively coupled to a storage device 310. Storage device 310 is any computer-operated hardware suitable for storing and/or retrieving data. In some embodiments, storage device 310 is integrated in server computing device 302. For example, server computing device 302 may include one or more hard disk drives as storage device 310. In other embodiments, storage device 310 is external to server computing device 302 and may be accessed by a plurality of server computing devices 302. For example, storage device 310 may include multiple storage units such as hard disks or solid state disks in a redundant array of inexpensive disks (RAID) configuration. Storage device 310 may include a storage area network (SAN) and/or a network attached storage (NAS) system.

In some embodiments, processor 304 is operatively coupled to storage device 310 via a storage interface 312. Storage interface 312 is any component capable of providing processor 304 with access to storage device 310. Storage interface 312 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 304 with access to storage device 310.

Memory area 306 may include, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are example only, and are thus not limiting as to the types of memory usable for storage of a computer program.

Referring back to the example embodiment of FIG. 1, CT imaging scanner 106 obtains image data from captured images of objects or items (for example and without limitation, one or more of items 112, 114, 116) in a continuous stream of objects using one or more of imaging devices 110. Generally, CT imaging scanner 106 acquires in a continuous stream of image data of the scanned items, as shown of FIG. 1, in any number of formats including helical image data. The CT imaging scanner 106 (or alternatively object detection controller 104) may utilize a reconstruction transformation or process to generate a series of CT image slices (i.e., CT image slice data). For example and without limitation, various reconstruction transformation algorithms or methods may include ray consistency reconstruction, filtered backprojection, Feldkamp reconstruction algorithm, or phi reconstruction algorithm. After capturing image data and performing a reconstruction transformation on the image data, CT imaging scanner 106 transmits, in a continuous manner, CT imaging data that includes a series of multiple CT imaging slices that includes a representation of the imaged stream of items to object detection controller 104 for processing.

After receiving the CT imaging slices, object detection controller 104 may process one or more CT imaging slices in series or in parallel. For clarity, the process below is described on a slice-by-slice basis, but it is understood that multiple CT imaging slices could be processed simultaneously. Moreover, object detection controller 104 may assemble the CT imaging slices into segments by any number or distribution between segments. For example and without limitation, each segment may include a fixed or identical number of CT imaging slices or may include a variable number of CT imaging slices. Furthermore, each segment may overlap a neighboring segment and "share" some of the same CT imaging slices. In other words, one or more CT imaging slices may be utilized to assembly two different segments. As a result, each CT imaging slice may appear in two different segments and be stored in memory or storage twice. In other implementations, each CT imaging slice may be stored once, but still used in conjunction with two different segment through pointers or other means.

Figure 4:
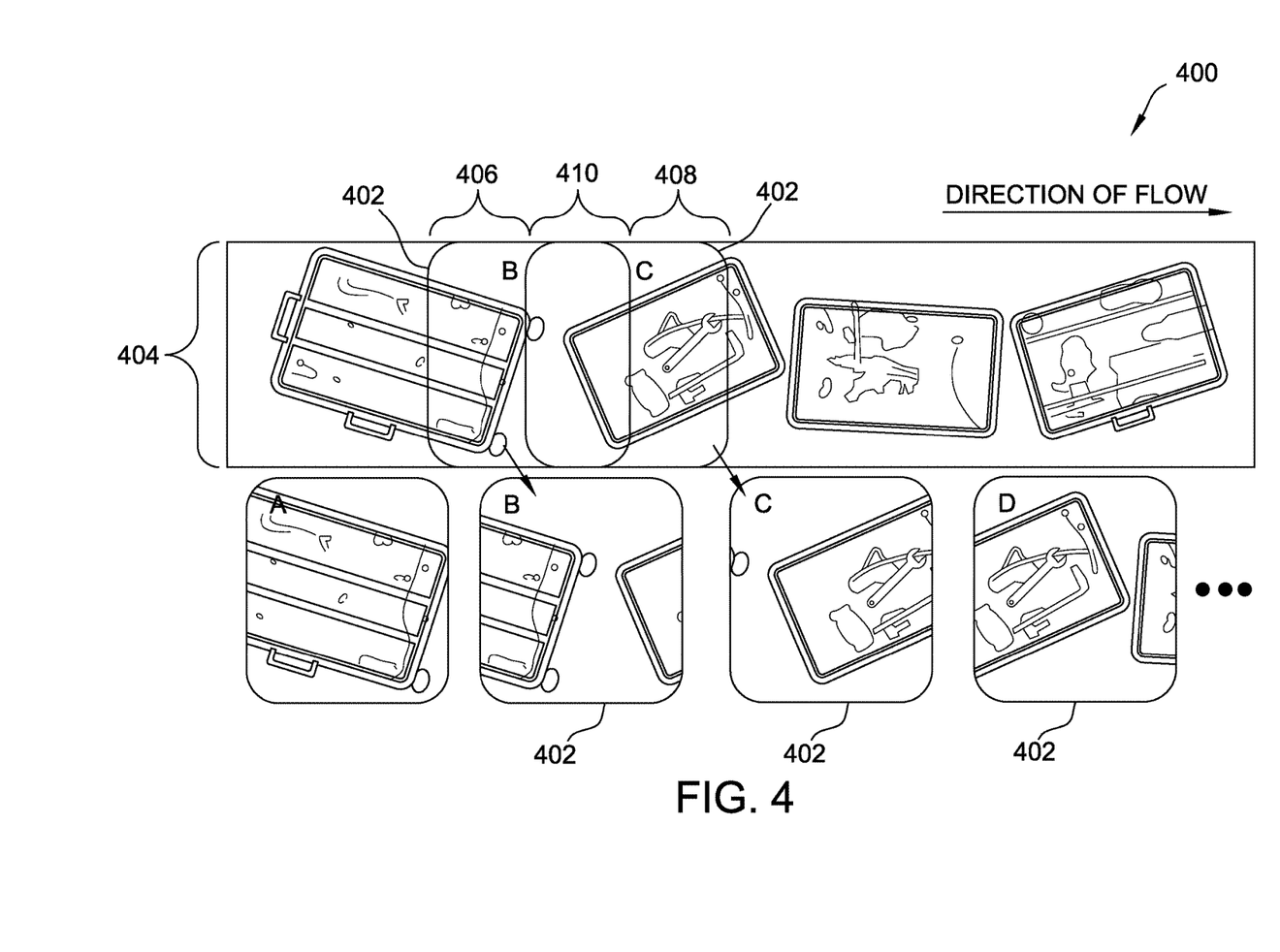
FIG. 4 is an illustrative view of a scanned and reconstructed continuous stream of objects and a plurality of segments used to create the continuous stream of objects from a CT imaging system as shown in FIG. 1.

FIG. 4 is an illustrative view 400 of a scanned and reconstructed continuous stream of objects 404 and a plurality of segments 402 used to create the reconstructed continuous stream of objects 404 from a CT imaging system 100. The illustrated reconstructed continuous stream of objects 404 is a 3D representation that a human inspector may view when analyzing a continuous stream of objects. Generally, object detection controller 104 generates this 3D human-perceivable view of reconstructed continuous stream of objects 404 by assembling or positioning individual segments 402 from one or more CT imaging slices. For example, segment B 402 includes CT imaging slices that include a representation of a portion of a bag (i.e., encompassed on the left side of the segment B 406) while segment C 402 includes CT imaging slices that include a representation of a backpack (i.e., encompassed on the right side of segment C 408). In between these two segment portions 406, 408 is an overlapped portion 410 in which both segment B and segment C include the same CT imaging slices. Each segment can be individually stored and retrieved based on an assigned reference identifier or an index identifier. Moreover, each segment may include a time stamp associated with a date and a time when one or more of the CT imaging slices associated with the segment were captured. The CT imaging scanner 106 may store a location identifier (e.g., an indexed position on conveyor 108 and/or a relative position of items 112, 114, and 116), GPS coordinates, an airport code identifier, or any other type of specific identifying information.

Advantageously, while continuous stream of objects 404 moves in the direction of flow as a continuous display to the inspector, object detection controller 104 allows an inspector to select a particular segment to more closely analyze the objects or contents represented within a segment. Moreover, prohibited items may be automatically selected or otherwise highlighted for the inspector. For example and without limitation, an inspector may select segment B by "grabbing" the segment 402 with a user interface device or by any other suitable manner of selecting a particular segment. In response to receiving this segment 402 selection, the object detection controller 104 may cause the physical movement of the continuous stream of objects 404 to cease and enlarge the selected segment. Furthermore, the object detection controller 104 may change the interaction of the enlarged segment 402 such that the representation of the 3D objects is interactive. As a result, the object detection controller 104 allows the inspector to rotate, pan, zoom, and otherwise interact with the representation of the 3D objects about an x-axis, a y-axis, and a z-axis associated with the segment 402.

Continuing this example, in response to receiving this segment 402 selection, object detection controller 104 causes CT imaging scanner 106, conveyor belt 108, motor 124, or any other mechanism to physically stop the flow of objects. In one embodiment, object detection controller 104 transmits a command to motor 124 that causes conveyor belt 108 to cease operating. When motor 124 receives this command and ceases operating, conveyor belt 108 begins to slow down by decelerating until conveyor belt 108 comes to a complete stop. Alternatively, the inspector or anyone else may select a stop selector (whether software, electrically, mechanically driven) to generate a stop request that is transmitted to object detection controller 104.

Figure 5:
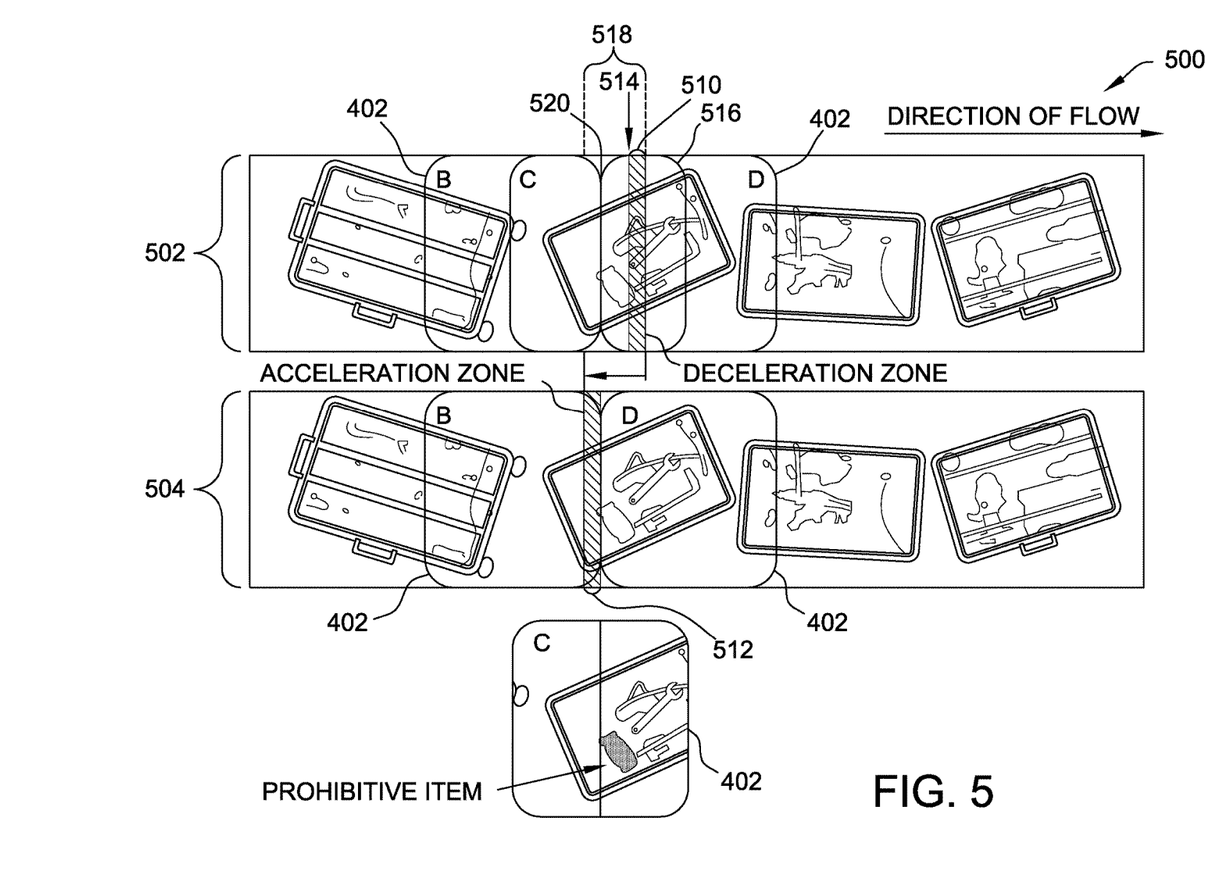
FIG. 5 is an illustrative view of a scanned and reconstructed continuous stream of objects stopping in a flow of objects, reversing relative to the flow of objects, and starting again in the flow the objects to rebuild segments from a CT imaging system as shown in FIG. 1.

FIG. 5 is an illustrative view 500 of a scanned and reconstructed continuous stream of objects 502 in which motor 124 has ceased to operate, and conveyor belt 108 has come to a stop. For illustration, a deceleration distance 510 is denoted on the reconstruction continuous stream objects 502 that indicates the distance conveyor belt 108 (and corresponding objects) traveled in a decelerating manner after motor 124 ceased operating. This deceleration distance 510 may be predetermined and stored as a fixed distance or may be dynamically determined for each stop request received. Furthermore, for illustration, an acceleration distance 512 is also denoted on the reconstruction continuous stream objects 502 that indicates the distance conveyor belt 108 (and corresponding item) requires to accelerate into a state of constant velocity. This acceleration distance 512 may be predetermined and stored as a fixed distance.

In any event, in response to receiving a stop request, object detection controller 104 causes motor 124 to cease operating which causes conveyor belt 108 and objects to come to a halt. Object detection controller 104 deletes or discards any CT imaging slices acquired after the stop request is received. In some embodiments, object detection controller 104 may discard the segments being acquired at the time the stop request is received. As shown in FIG. 5, the stop request is received at a point 514 during which partial segment 516 is acquired. Because partial segment 512 is included in the second half of segment C and the first half of segment D, the second half of C and the entirely of segment D is deleted. Object detection controller 104 causes motor 124 to operate in reverse such that conveyor belt 108 moves in a direction reverse the flow of objects by an interruption distance 518.

This interruption distance 518 is greater than the summation of deceleration distance 510 and acceleration distance 512. In other words, object detection controller 104 causes conveyor belt 108 (and corresponding objects) to move in the direction reverse the flow of objects by a distance that is more than deceleration distance 510 and acceleration distance 512 combined. This interruption distance 518 allows for a buffer during period of deceleration and acceleration in which CT imaging scanner 106 captures variable pitches. In some embodiments, object detection controller 104 may cause conveyor belt 108 to move farther than the combined two distances of deceleration distance 510 and acceleration distance 512. For example, object detection controller 104 may reverse the conveyor belt 108 by interruption distance 518 such that new imaging data may be reacquired from a point 520 where the last CT imaging was acquired at during a period of constant velocity. Thus, as shown in FIG. 5, object detection controller 104 causes the conveyor belt 108 to reverse by acceleration distance 512 that is further beyond point 520 at which the last CT imaging slice was acquired at a constant velocity. In turn, object detection controller 104 causes motor 124 to become operational so that when conveyor belt 108 reaches point 520, the conveyor belt 106 is moving at a constant velocity and CT imaging slices are appropriately captured at a fixed pitch. As a result, segment C is rebuilt or reassembled by using the second half of segment B (previously acquired before the stop requested was received) and the reacquired first half of segment D (as shown in the third row of FIG. 5).

A computer, such as those described herein, includes at least one processor or processing unit and a system memory. The computer typically has at least some form of computer readable media. By way of example and not limitation, computer readable media include computer storage media and communication media. Computer storage media include volatile and nonvolatile, removable and non-removable media implemented in any method or technology for storage of information such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Combinations of any of the above are also included within the scope of computer readable media.

Exemplary embodiments of methods and systems are described above in detail. The methods and systems are not limited to the specific embodiments described herein, but rather, components of systems and/or steps of the methods may be used independently and separately from other components and/or steps described herein. Accordingly, the exemplary embodiment can be implemented and used in connection with many other applications not specifically described herein.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose various embodiments, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An object detection controller for detecting objects moving in a first direction in a computed tomography (CT) imaging system, said object detection controller including a processor coupled to a memory device and to the CT imaging system, said object detection controller is configured to detect objects by:
   receiving CT imaging data generated by the CT imaging system;
   generating a plurality of CT imaging slices from the CT imaging data;
   assembling a plurality of segments based on the generated plurality of CT imaging slices, wherein two neighboring segments of the plurality of segments include at least one substantially equivalent CT imaging slice;
   in response to receiving a stop request:
      causing the CT imaging system to cease a flow of objects;
      discarding one or more of the plurality of CT imaging slices associated with a first segment and a second segment of the plurality of segments, wherein the first segment and the second segment are being assembled at the time the stop request is received;
      causing the CT imaging system to move the objects in a second direction for an interruption distance, wherein the second direction is opposite the first direction;
      causing the CT imaging system to move the objects in the first direction; and
      reassembling the first segment and the second segment based on newly received CT imaging slices.

2. The object detection controller of claim 1, wherein the interruption distance is equal to at least the summation of a deceleration distance and an acceleration distance.

3. The object detection controller of claim 2, wherein the deceleration distance includes a distance that the objects travel during the time period between receiving the stop request and the objects coming to rest.

4. The object detection controller of claim 2, wherein the acceleration distance includes a distance that the objects travel during the time period between the objects being at rest and the objects traveling at a constant velocity.

5. The object detection controller of claim 1, wherein each segment of the plurality of segments includes a time stamp and geographic location.

6. The object detection controller of claim 1, wherein each segment of the plurality of segments includes an identical number of CT imaging slices.

7. The object detection controller of claim 1, wherein each segment of the plurality of segments is individually stored.

8. A computer-implemented method for detecting objects moving in a first direction in a computed tomography (CT) imaging system, said method implemented using an object detection device including a processor coupled to a memory device and to the CT imaging system, said method comprising:
   receiving CT imaging data generated by the CT imaging system;
   generating a plurality of CT imaging slices from the CT imaging data;
   assembling a plurality of segments based on the generated plurality of CT imaging slices, wherein two neighboring segments of the plurality of segments include at least one substantially equivalent CT imaging slice;
   in response to receiving a stop request:
      causing the CT imaging system to cease a flow of objects;
      discarding one or more of the plurality of CT imaging slices associated with a first segment and a second segment of the plurality of segments, wherein the first segment and the second segment are being assembled at the time the stop request is received;
      causing the CT imaging system to move the objects in a second direction for an interruption distance, wherein the second direction is opposite the first direction;
      causing the CT imaging system to move the objects in the first direction; and
      reassembling the first segment and the second segment based on newly received CT imaging slices.

9. The method of claim 8, wherein the interruption distance is equal to at least the summation of a deceleration distance and an acceleration distance.

10. The method of claim 9, wherein the deceleration distance includes a distance that the objects travel during the time period between receiving the stop request and the objects coming to rest.

11. The method of claim 9, wherein the acceleration distance includes a distance that the objects travel during the time period between the objects being at rest and the objects traveling at a constant velocity.

12. The method of claim 8, wherein each segment of the plurality of segments includes a time stamp and geographic location.

13. The method of claim 8, wherein each segment of the plurality of segments includes an identical number of CT imaging slices.

14. The method of claim 8, wherein each segment of the plurality of segments is individually stored.

15. At least one non-transitory computer-readable storage media having computer-executable instructions embodied thereon for detecting objects moving in a first direction in a computed tomography (CT) imaging system, wherein when executed by at least one processor, the computer-executable instructions cause the processor to:

receive CT imaging data generated by the CT imaging system;

generate a plurality of CT imaging slices from the CT imaging data;

assemble a plurality of segments based on the generated plurality of CT imaging slices, wherein two neighboring segments of the plurality of segments include at least one substantially equivalent CT imaging slice;

in response to receiving a stop request:

cause the CT imaging system to cease a flow of objects;

discard one or more of the plurality of CT imaging slices associated with a first segment and a second segment of the plurality of segments, wherein the first segment and the second segment are being assembled at the time the stop request is received;

cause the CT imaging system to move the objects in a second direction for an interruption distance, wherein the second direction is opposite the first direction;

cause the CT imaging system to move the objects in the first direction; and reassemble the first segment and the second segment based on newly received CT imaging slices.

16. At least one non-transitory computer-readable storage media in accordance with claim 15, wherein the interruption distance is equal to at least the summation of a deceleration distance and an acceleration distance.

17. At least one non-transitory computer-readable storage media in accordance with claim 16, wherein the deceleration distance includes a distance that the objects travel during the time period between receiving the stop request and the objects coming to rest.

18. At least one non-transitory computer-readable storage media in accordance with claim 16, wherein the acceleration distance includes a distance that the objects travel during the time period between the objects being at rest and the objects traveling at a constant velocity.

19. At least one non-transitory computer-readable storage media in accordance with claim 15, wherein each segment of the plurality of segments includes a time stamp and geographic location.

20. At least one non-transitory computer-readable storage media in accordance with claim 15, wherein each segment of the plurality of segments is individually stored.

* * * * *